United States Patent [19]
Sun

[11] Patent Number: 5,857,133
[45] Date of Patent: Jan. 5, 1999

[54] INFORMATION READING APPARATUS HAVING A CONTACT IMAGE SENSOR

[75] Inventor: Chung-Yueh Sun, Tainan, Taiwan

[73] Assignee: Mustek Systems, Inc., Hsinchu, Taiwan

[21] Appl. No.: 916,941

[22] Filed: Aug. 25, 1997

[30] Foreign Application Priority Data

Mar. 7, 1997 [TW] Taiwan .................................. 85203527

[51] Int. Cl.$^6$ ........................... G03G 18/04; H04N 1/031
[52] U.S. Cl. ............................................. 399/211; 358/497
[58] Field of Search ........................... 399/211; 358/494, 358/497; 355/75

[56] References Cited

U.S. PATENT DOCUMENTS 5,610,731  3/1997  Itoh .......................................... 358/496

FOREIGN PATENT DOCUMENTS 1-293755  11/1898  Japan .
1-293756  11/1989  Japan .
7-193689  7/1995  Japan .

*Primary Examiner*—Joan Pendegrass
*Attorney, Agent, or Firm*—Sughrue, Mion, Zinn, Macpeak & Seas, PLLC

[57] ABSTRACT

The present invention discloses a new information reading apparatus which employs a CIS module for reading the image information from a sheet. The invention is characterized by using a single guiding device for guiding and supporting a CIS carriage in balance while contacting tightly with the bottom surface side of the sheet table. Since the space between the CIS module and the sheet table can be controlled this way, we can assure the sheet in focus. Consequently, the picture quality of the images generated by the CIS scanner can be improved.

14 Claims, 4 Drawing Sheets

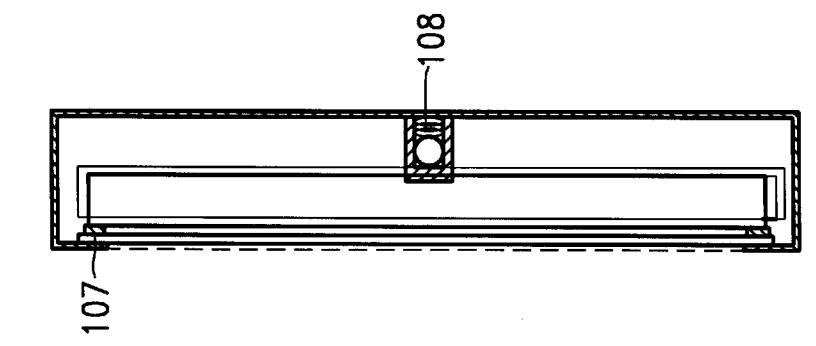
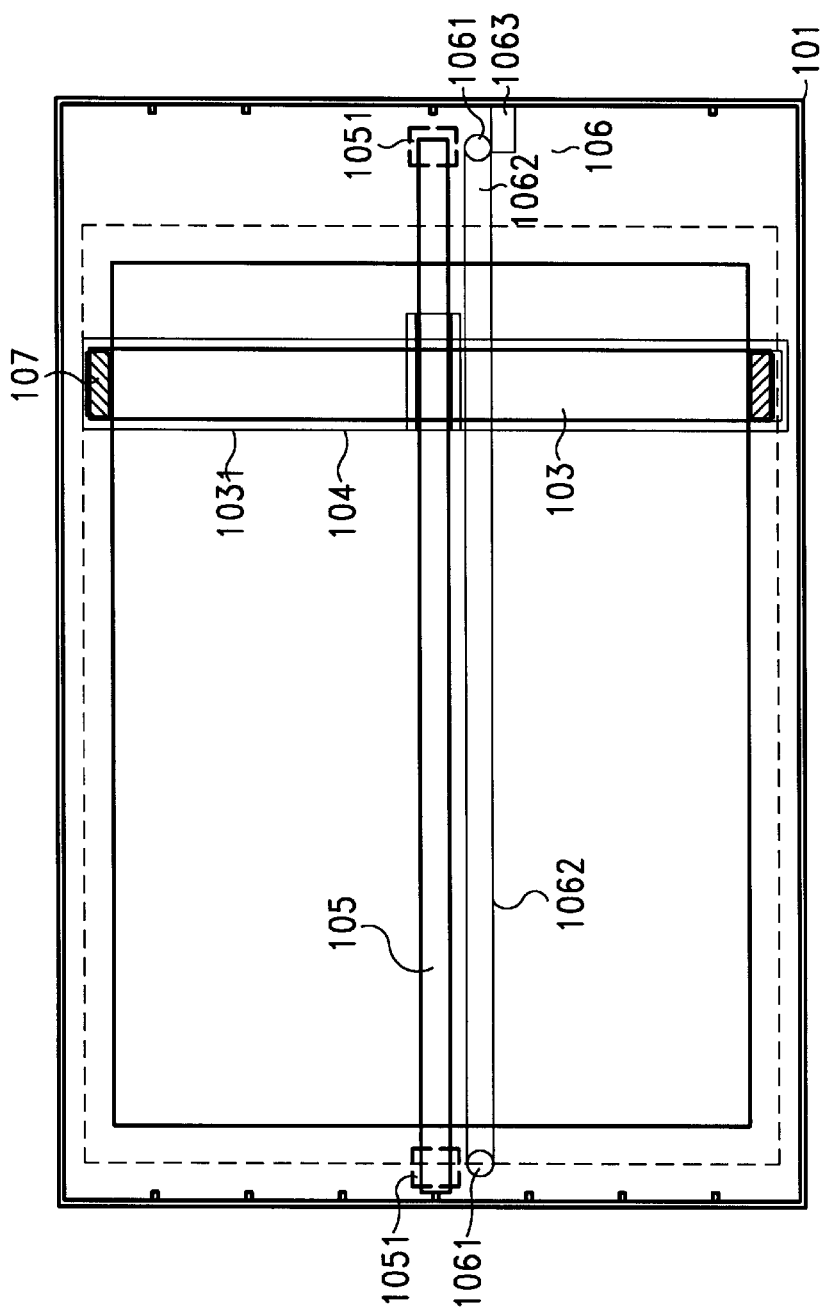
FIG. 1A
FIG. 1B
FIG. 1C

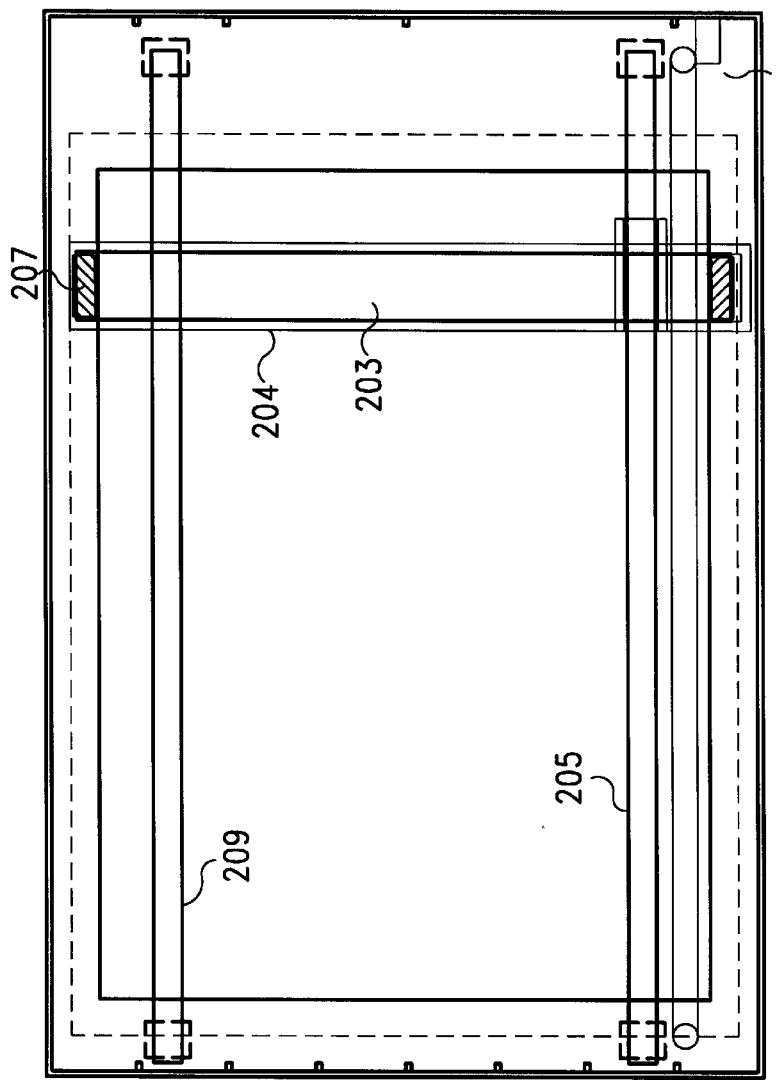
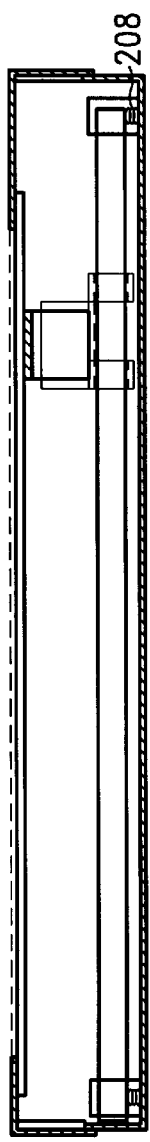
FIG. 2A
FIG. 2B
FIG. 2C

INFORMATION READING APPARATUS HAVING A CONTACT IMAGE SENSOR

BACKGROUND OF THE INVENTION

A. Field of the Invention

The invention relates to a flatbed scanner having a contact image sensor, especially to a flatbed scanner using only a single guiding device for supporting and guiding the contact image sensor to contact tightly with the bottom surface side of the sheet table, thereby to maintain a constant light path.

B. Description of the Prior Art

A conventional flatbed scanner preferably uses a CCD line sensor for reading the image information from a sheet because the CCD line sensor can provide stable and good picture quality of images. The trade-off for using a CCD line sensor is that the size of the flatbed scanner is restricted by the light path required for the CCD line sensor. For this reason, the size of the flatbed scanner can hardly be reduced in a great scale even with the aid of mirror arrays to reflect the light beams.

Recently, a new approach is trying to replace a CCD line sensor with a contact image sensor contact sensor for producing low-end flatbed scanners. An advantage for this new approach is that it can save a lot of time and efforts in assembly and maintenance because a contact image sensor contact sensor is modularized. All the necessary optical elements, such as mirrors, light source and a photoelectric converting device, are included in a compact module. Thus, a contact image sensor module (hereinafter referred to as CIS module), can help to simplify the inner structure of a scanner. Moreover, a contact image sensor contact sensor is smaller and lighter than a CCD line sensor. With a contact image sensor contact sensor, the scanner can be portable with height around 30 mm. Nevertheless, this new approach did not prevail. The main reason is because the scene depth of a contact image sensor is only about 0.3 mm. Based on the structure of a conventional flatbed scanner, it is very difficult to assure the sheet remains in focus. Even a small manufacture error or structure distortion will affect the picture quality of the images.

SUMMARY OF THE INVENTION

Accordingly, it is an object of the present invention to provide a flatbed scanner having a contact image sensor which employs a single guiding device for guiding and supporting a CIS module to contact tightly with the bottom surface side of the sheet table, thereby to overcome the short-focus-length problem occurred in a CIS module.

It is another object of the present invention to provide a small and portable a flatbed scanner having a contact image sensor which can provide stable and good picture quality of images.

It is a further object of the present invention to provide a simple-structure flatbed scanner which uses only a single guiding device for guiding and supporting a contact image sensor carriage in balance, thereby to simplify the inner structure of the scanner and make the scanner easy to assemble and maintain.

Preferred embodiments of the present invention include: a housing with a sheet table on the top, a CIS module carried by a contact image sensor carriage (hereinafter referred to as CIS carriage), a single guiding device crossed over the bottom center of the CIS carriage, and a driving device. The CIS carriage comprising a CIS module is mounted on a single guiding device and beneath the bottom surface side of the sheet table. The guiding device rests on a pair of supports in a manner that the CIS module can contact tightly with the bottom surface side of the sheet table. Inside each of the supports, an elastic element is installed beneath the guiding device for supporting the guiding device and keeping the CIS module in balance while moving on the guiding device. To reduce the friction between the CIS module and the sheet table, two pieces of slide-blocks are attached on the top surface of the CIS module. With the aid of the elastic elements, the CIS carriage can contact tightly with the sheet table having the slide-blocks interposed therebetween while moving smoothly on the guiding device. Thus, the sheet will remain in focus. The CIS carriage is then driven by a driving device from one end of the sheet table to the opposite end of the sheet table, thereby to complete the process of image reading.

BRIEF DESCRIPTION OF THE DRAWINGS

These and other objects and advantages of the present invention will become apparent by reference to the following description and accompanying drawings wherein:

FIG. 1A is a perspective top view schematically showing the structure of a preferred embodiment of the invention.

FIG. 1B is a perspective side view schematically showing the structure of a preferred embodiment of the invention.

FIG. 1C is a perspective front view schematically showing the structure of a preferred embodiment of the invention.

FIG. 2A is a perspective top view schematically showing the structure of another preferred embodiment of the invention.

FIG. 2B is a perspective side view schematically showing the structure of another preferred embodiment of the invention.

FIG. 2C is a perspective front view schematically showing the structure of another preferred embodiment of the invention.

DETAILED DESCRIPTION OF THE PREFERRED EMBODIMENTS

Figure 3C:
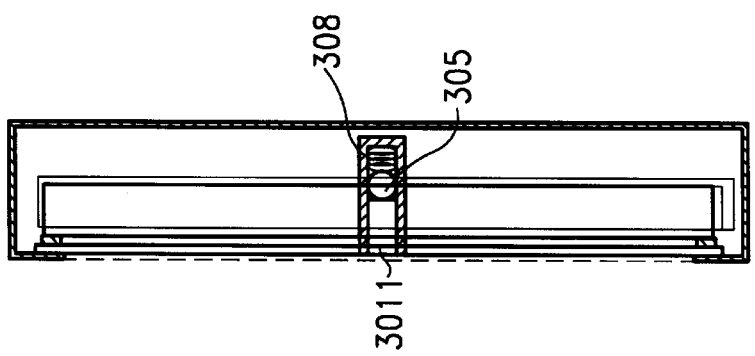
FIG. 3C is a perspective front view schematically showing the structure of another preferred embodiment of the invention.

A few preferred embodiments of the invention are described below. These embodiments are merely exemplary. Those skilled in the art will appreciate that changes can be made to the disclosed embodiments without departing from the spirit and scope of the invention.

To overcome the focus-length restrictions for a contact image sensor, the invention provides a new guiding and supporting structure for the CIS module. Refer to FIGS. 1A–1C, the invention mainly includes a housing 101 substantially in a form of a box, a sheet table 102 on top of the housing 101, a CIS module 103 carried by a CIS carriage 104, a guiding device 105, a pair of supports 1051 and a driving device 106.

The CIS carriage 104 consists of a CIS module 103 and a carriage 1031. The CIS module 103 is a modularized unit which includes elements necessary for reading and converting image information, such as light source, mirrors, and a photoelectric converting device. More specifically, the respective longitudinal dimensions of the CIS module 103 is equal to or greater than the length of one side of the sheet table for linearly reading the image information of the sheet.

The CIS carriage 104 is mounted on a guiding device 105 which can be a rail shaft, a transmission shaft or a guiding shaft. The guiding device 105 crosses over the bottom center of the CIS carriage 104 for guiding and supporting the CIS carriage 104 in balance while moving along the sheet table 102. The guiding device 105 rests on a pair of supports 1051 sufficiently high enough to support the CIS carriage 104 to contact tightly with the bottom surface side of the sheet table 102. Inside each support 1051, an elastic element 108, such as spring, rubber, or spring support is installed under the guiding device 105 for supporting the guiding device 105. The elastic element 108 help to lift the guiding device 105 firmly upwards so that the CIS carriage 104 can contact the bottom surface of the sheet table 102 tightly even when the housing 105 or the structure slightly distorts. Since the CIS carriage 104 contacts tightly with the bottom surface side of the sheet table 102, it can keep in balance while moving on the single guiding device 105.

Two pieces of sliding elements 107, such as slide-blocks or slippers, are attached to the top surface of the CIS module 103 and interposed between the CIS module 103 and the sheet table 102 for reducing the friction therebetween. The sliding elements 107 are made of rigid body and cut with precision for leaving a definite space between the CIS carriage 104 and the sheet table 102. Since the CIS module 103 always contacts tightly with the bottom surface of the sheet table 102, therefore the sheet will not shift away from the scene depth of the CIS module 103. Consequently, the picture quality of images generated by the CIS module can be improved.

The CIS carriage 104 is driven by a driving device 106 which includes a driving motor 1063, a set of pulleys 1061, and a conveying element 1062. The conveying element 1062 is a timing belt or a steel wire rope in a shape of closed-loop. The pulleys 1061 locate at the opposite ends of the guiding device 105 and coupling to the driving motor 1063. The conveying element 1062 surrounds the pulleys 1061 in a shape of a closed-loop and coupling to the CIS carriage 104. When the driving motor 1063 is enabled, it drives the set of pulleys 1061. The rotation of the pulleys 1061 will drive the conveying element 1062 which further move the CIS carriage 104 from one end of the sheet table 102 to the other end of the sheet table 102 to complete the image reading process of the sheet.

It shall be understood that the number of the guiding device 105 as shown in FIG. 1A can be increased as long as it can support and guide the CIS carriage in balance along the sheet table. The preferred embodiment of the invention shown in FIGS. 1A–1C has the simplest structure which can guarantee the balance of the CIS carriage 104 while moving on the guiding device 105. There may be various alternatives for the guiding device 105. For instance, the guiding device can be installed on one side of the CIS carriage with a support device on the other side as illustrated in FIGS. 2A–2C. Refer to FIGS. 2A–2C, the CIS carriage 204 is mounted on a guiding device 205 and a support device 209 which are parallel to each other and capable of supporting the CIS carriage 204 to contact tightly with the bottom surface side of the sheet table. The support device 209 can be a guiding shaft, a transmission shaft or a rail shaft. The function of the driving device 206 is the same but installed on one side of the guiding device 206 for moving the CIS carriage 204 along the sheet. The sliding elements 207 are made of rigid body and cut with precision. The thickness of the sliding elements 207 determines the distance between the CIS module 203 and the sheet (not shown) for assuring the sheet stay in focus.

Figure 3A:
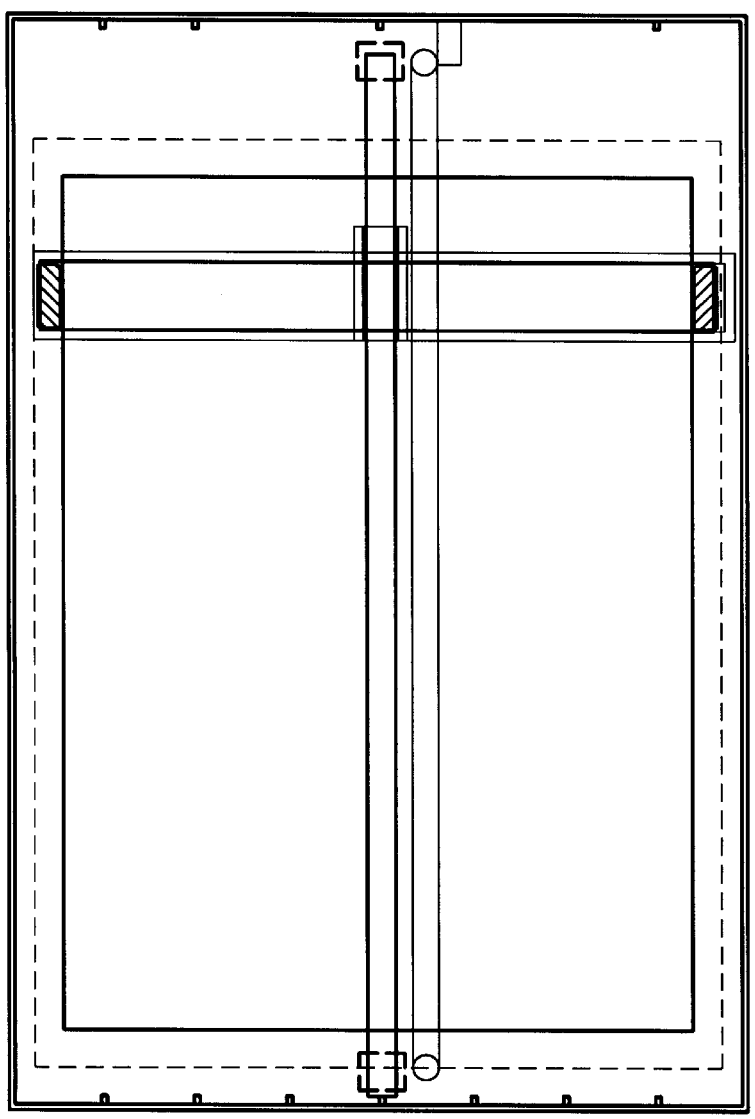
FIG. 3A is a perspective top view schematically showing the structure of another preferred embodiment of the invention.
Figure 3B:
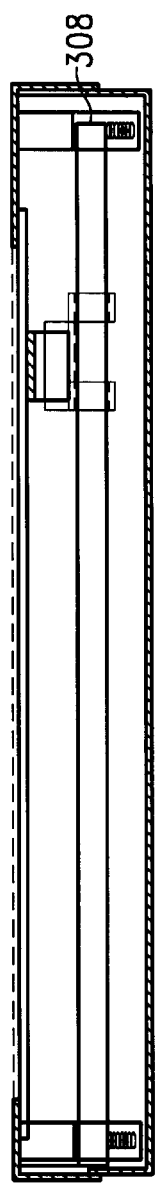
FIG. 3B is a perspective side view schematically showing the structure of another preferred embodiment of the invention.

The supports of the guiding device are not necessarily fixed on the inner bottom of the housing. Alternatively, they can also be fixed on the inner upper side of the housing as shown in FIGS. 3A–3C. The supports 3051 are fixed on the inner upper side of the housing 3011. The elastic elements 308 are also beneath the guiding device 305. The rest remains the same.

Figure 4C:
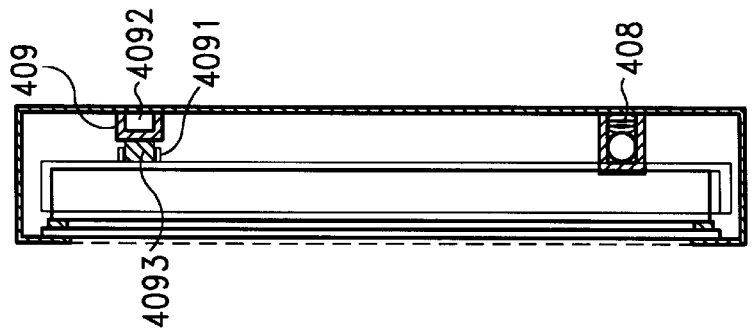
FIG. 4C is a perspective front view schematically showing the structure of another preferred embodiment of the invention.
Figure 4A:
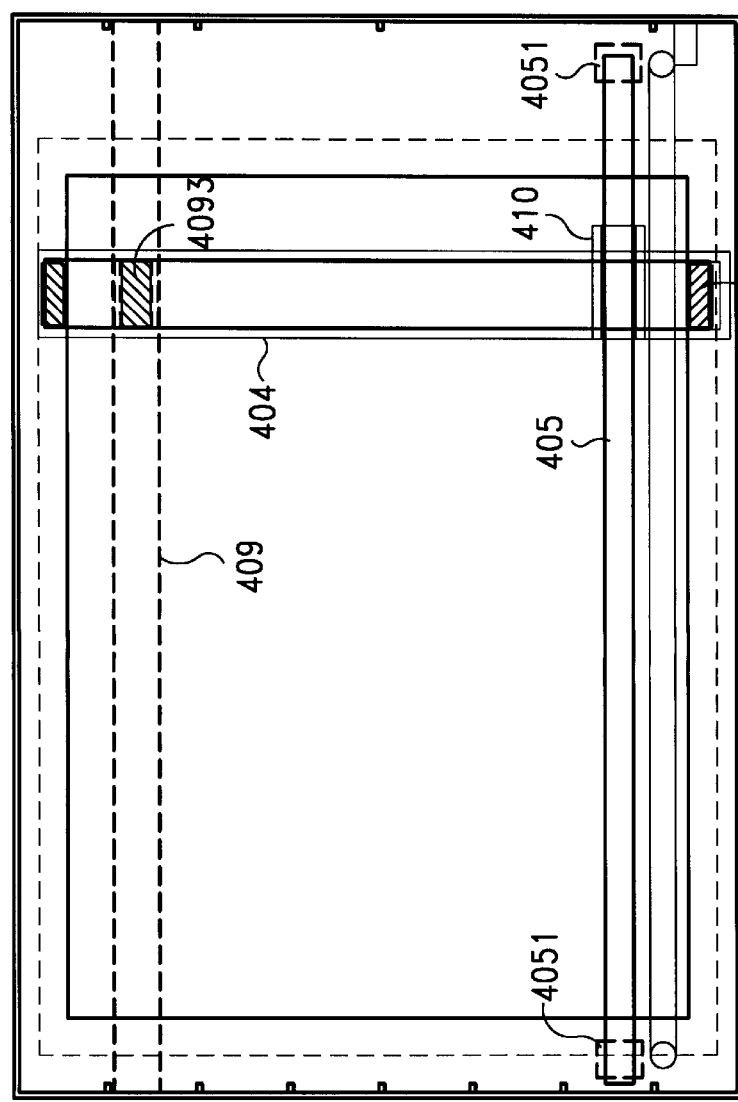
FIG. 4A is a perspective top view schematically showing the structure of another preferred embodiment of the invention.
Figure 4B:
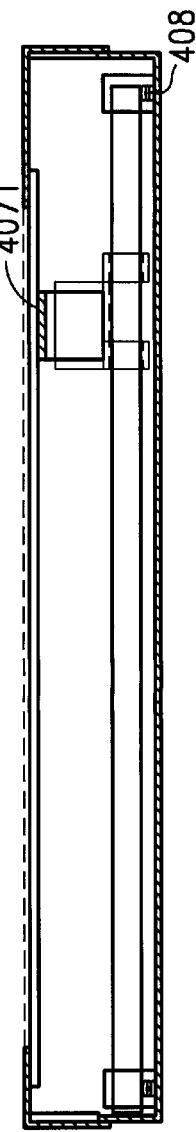
FIG. 4B is a perspective side view schematically showing the structure of another preferred embodiment of the invention.

There may also be various alternatives for the support device as illustrated in FIG. 4. For instance, the difference between FIGS. 2A–2C and FIGS. 4A–4C is only in the part of guiding device. Refer to FIGS. 4A–4C, the CIS carriage 404 is mounted on a pair of guiding device 409, 405. The guiding device 409 consists of a groove 4091 and a flange 4093. The groove 4091 locates at the bottom of the CIS carriage 404. Facing the groove 4091, there is a flange 4093 with a seat 4092 fixed on the bottom of the housing. The flange 4093 is made of elastic elements, such as rubber, spring leaf, or spring support. The other guiding device 405 is parallel to guiding device 409 and supported by a pair of supports 4051. Inside each support 4051, there is an elastic element 408, such as spring, beneath the guiding device 405 for lifting the CIS carriage 404 to contact the bottom surface of the sheet table (not shown). The guiding device 405 is further guided by a shaft 410 attached to the bottom of the CIS carriage 404. The length of the shaft 410 shall be longer than the width of the CIS carriage 404, so as to keep the balance of the CIS carriage 404 while moving on the guiding device 405. Note that the elastic element 408 and the flange 4093 help to lift the CIS carriage 404 upwards in a manner that the CIS carriage 404 can tightly contact the bottom surface of the sheet table (not shown). Therefore, this embodiment also can guarantee the document sheet stay in focus.

From the preferred embodiments as described above, it can be understood that the invention can overcome the short-focus-length problem for a CIS module because the CIS module always contact tightly with the bottom surface side of the table sheet while moving along the sheet table. With the elastic elements installed inside the supports, the CIS module can contact the bottom surface side of the table sheet more firmly. Therefore, the distortion of the housing due to manufacture errors or other reasons will not affect the scene depth of the CIS module. More specialty, the invention takes the full advantage of the modularized CIS module and provides a simple-structure guiding device, thereby to make the apparatus more easy to assemble and maintain.

It should be understood that various alternatives to the structures described herein may be employed in practicing the present invention. It is intended that the following claims define the invention and that the structure within the scope of these claims and their equivalents be covered thereby.

What is claimed is:

1. An image information reading apparatus having a housing comprising:
    a sheet table on top of said housing for supporting a document sheet;
    a contact image sensor module carried by a carriage disposed beneath the bottom surface side of said sheet table, said contact image sensor having a plurality of slide-blocks attached onto the top surface of said contact image sensor module;
    single guiding means crossed over the bottom center of said carriage for guiding said carriage along said sheet table, said single guiding means mounted on a pair of supports at opposite ends for holding and supporting said guiding means in a manner that said contact image sensor module can contact the bottom surface side of said sheet table tightly with said plurality of slide-blocks interposed therebetween; and
    driving means located at one side of said single guiding means for reciprocally moving said carriage along said sheet table from a first direction to a second direction.

2. The apparatus as claimed in claim 1, wherein said driving means comprises:
    a driving motor;
    a pair of pulleys driven by said driving motor and located at opposite ends of said single guiding means; and
    conveying means surrounding said pair of pulleys in a shape of a closed-loop and connecting to said carriage.

3. The apparatus as claimed in claim 1 further comprising:
    elastic means disposed inside said pair of supports and beneath said guiding means for supporting said guiding means.

4. The apparatus as claimed in claim 1, wherein said single guiding means comprises at least one of a guiding shaft, a transmission shaft or a rail shaft.

5. The apparatus as claimed in claim 1, wherein said pair of supports are fixed on the inner bottom of said housing or on the inner upper side of said housing.

6. The apparatus as claimed in claim 2, wherein said conveying means comprises at least one of a steel wire rope or a timing belt.

7. The apparatus as claimed in claimed 3, wherein said elastic means comprises at least one of a spring, rubber, or spring support.

8. An image information reading apparatus having a housing comprising:
    a sheet table on top of said housing for supporting a document sheet;
    a contact image sensor module carried by a carriage disposed beneath the bottom surface side of said sheet table, said contact image sensor having a plurality of slide-blocks attached onto the top surface of said contact image sensor module, said carriage having a groove at its bottom side;
    a flange facing said groove of said carriage for supporting and guiding said carriage from one side, said flange disposed on a seat which is fixed at the bottom of said housing;
    guiding means located parallel to said seat for guiding said carriage along said sheet table, said guiding means mounted on a pair of supports at opposite ends for holding and supporting said guiding means in a manner that said contact image sensor module can contact the bottom surface side of said sheet table tightly with said plurality of slide-blocks interposed therebetween; and
    driving means located at one side of said single guiding means for reciprocally moving said carriage along said sheet table from a first direction to a second direction.

9. The apparatus as claimed in claim 8, wherein said driving means comprises:
    a pair of pulleys each locating at the opposite ends of said guiding means;
    conveying means surrounding said pulleys in a shape of a closed-loop and connecting to said carriage; and
    a driving motor coupling to one of said pair of pulleys for reciprocally moving said carriage along said sheet table from a first direction to a second direction.

10. The apparatus as claimed in claim 8, wherein said flange is made of at least one of elastic rubber, spring leaf or spring support.

11. The apparatus as claimed in claim 8, further comprising:
    elastic means disposed inside said pair of supports and beneath said guiding means for supporting said guiding means.

12. The apparatus as claimed in claim 11, wherein said elastic means comprises at least one of a spring, rubber, or spring support.

13. The apparatus as claimed in claim 8, wherein said guiding means comprises at least one of a guiding shaft, a transmission shaft or a rail shaft.

14. The apparatus as claimed in claim 9, wherein said conveying means comprises at least one of a steel wire rope or a timing belt.

* * * * *